United States Patent [19]
Dubost

[11] 3,720,987
[45] March 20, 1973

[54] PROCESS FOR THE MANUFACTURE OF SLEWING RINGS OR BEARING ASSEMBLIES

[75] Inventor: Jacques Leon Francois Dubost, Ville D'Avary, France

[73] Assignee: R. K. S., Avallon(Yonne), France

[22] Filed: Feb. 17, 1971

[21] Appl. No.: 116,141

[30] Foreign Application Priority Data

Feb. 20, 1970 France..................................7006121

[52] U.S. Cl.........29/148.4 R, 29/149.5 R, 29/159.2, 29/DIG. 6
[51] Int. Cl.......B21h 1/12, B21d 53/10, B23p 17/00
[58] Field of Search.......29/148.4 R, 149.5 R, 159.2, 29/527.6, DIG. 6; 164/114

[56] References Cited

UNITED STATES PATENTS

| | | | |
|---|---|---|---|
| 1,520,749 | 12/1924 | Brownrigg | 164/114 |
| 1,781,098 | 11/1930 | Broderick et al. | 29/DIG. 6 |
| 1,908,187 | 5/1933 | Ross | 29/159.2 |
| 1,987,784 | 1/1935 | McDonald | 29/DIG. 6 |
| 2,275,503 | 3/1942 | Brown | 29/527.6 |
| 2,289,703 | 7/1942 | Goerke et al. | 29/149.5 R |

Primary Examiner—Thomas Eager
Attorney—Irving M. Weiner

[57] ABSTRACT

A process for manufacturing slewing rings or bearings-rings by centrifugally casting steel to cause the migration of iron particles toward the exterior region of the casting and carbon particles toward the interior region of the casting, and subsequently, quenching the casting to produce a higher degree of hardness to its' internal region relative to its' external region and a higher degree of toughness to its' external region relative to its' internal region.

5 Claims, 6 Drawing Figures

PATENTED MAR 20 1973 3,720,987

INVENTOR
JACQUES LEON FRANCOIS DUBOST

BY Irving M. Weiner
ATTORNEY 3,720,987

PROCESS FOR THE MANUFACTURE OF SLEWING RINGS OR BEARING ASSEMBLIES

This invention relates to the field of metal working.

In lifting equipment, in particular, the rotation of components generally requires a rotating support which, in the prior art, is provided by a pivot. More modern designs make use of slewing ring or bearing assembly with incorporated toothing leading to economies from the construction and maintenance standpoints.

For such slewing rings, surfaces of great hardness are required for the support of the rolling elements, together with a metal of high strength for the gear teeth.

The combination of these qualities in a single metal involves very costly materials.

An object of the present invention is to provide an economic solution to the problem.

Accordingly, the present invention provides a process for the manufacture of at least one ring of a bearing assembly having external toothing, wherein the ring is made in a mold by centrifugal casting, said mold being made to pivot around an axis which is precisely that of the ring.

In this manner, as the metal used is steel — carbon steel or similar alloy — and carbon having a lower density than iron, the centrifugal action applied while the metal is still in the liquid or pasty condition produces a preferential migration of the iron in the region of the toothing and a concentration of carbon in the region where the roller paths are cut.

The regions of the said paths, sufficiently rich in carbon, may be effectively quenched before grinding so that for the toothing one obtains a region of high strength and, for the roller paths, a zone of great hardness.

Another object of the invention is a manufacturing process applying centrifugal casting, but in which the mold is intended for making a tubular element capable of being cut up into a relatively large number of rings for the same casting operation.

One embodiment of the invention comprises a manufacturing process with a mold rotating around a horizontal axis, while another embodiment comprises a mold rotating around a vertical axis.

In the case of individual casting, which can also be considered, as well as in the case of multiple ring casting the mold cavities may be given a form such that the corresponding gear teeth have convex flanks permitting a better distribution of contact pressures in the gear teeth and a reduction in highly concentrated stresses.

Moreover, the scope of the invention covers all types of gear teeth, as well as all reliefs, extensions and other shapes, whatever the kind and whatever the use made thereof, as, for example, attaching lugs, bosses forming cams or other shapes.

All these external reliefs call for greater toughness in the metal, without requiring hardness.

The rings thus obtained, and their applications are not in any way restricted to lifting equipment, it being possible for other devices such as machine-tools, vehicles or components of these to work in conjunction with the rings thus manufactured, whenever the pivoting of heavy loads is involved. Thus, such bearing assembly may be used for the mobility of artillery turrets, on land or sea, between elements of articulated vehicles, for machine-tools turrets, for handling equipment and for all other similar applications.

The bearing assemblies thus made are more economical and sturdier than those obtained by the conventional means of the art.

The following description of embodiments of such bearing assemblies and of arrangements of mechanisms permitting them to be obtained will provide a better understanding of the invention and its various advantages.

Figure 1:
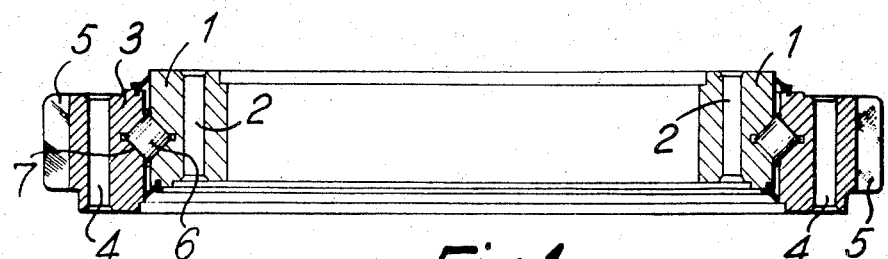
FIG. 1 represents a diametrical section of a bearing assembly, with the external ring appearing in bolder lines than the internal ring.

As can be seen in FIG. 1, a bearing assembly comprises an internal ring 1 having perforations 2 for attachment to a support (not shown), said internal ring being surrounded by an external ring 3 also provided with perforations 4 for attachment to an element (not shown) which is mobile in relation to the abovementioned support. On its periphery, the ring 3 is provided with a toothing 5. The parts opposite these rings may be connected to each other by crossed rollers 6 which travel on guide and roller paths 7 having a mutual right angle inclination.

Figure 2:
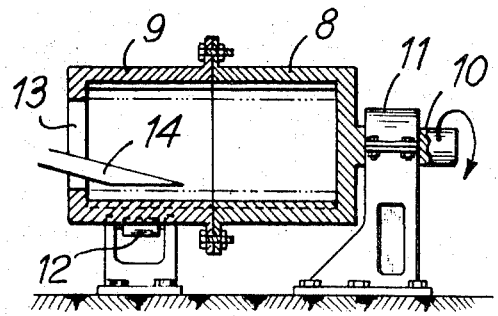
FIG. 2 is schematic representation of a particular embodiment of a horizontal-axis centrifugal casting machine.

As regards the external ring sleeving ring or bearing-ring 3, according to the invention, it is advantageous to produce them by centrifugal casting. For this purpose and as shown in FIG. 2, one may use a cylindrical mold 8 having cavities 9 on its periphery for forming the teeth 5, said mold opening in any desired manner, supported on one side by a driving pivot 10 in a bearing 11 and, on the other side, by a support with rollers 12 allowing the clearance of a front opening 13 for the passage of a nozzle 14 for the liquid metal inlet.

Figure 3:
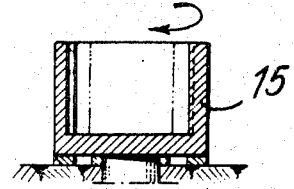
FIG. 3 represents a variant of the machine of FIG. 2.

As can be seen in FIG. 3, using certain precautions in the feeding, such a mold 5 could be designed in the form of a bowl 15 pivoting around a vertical axis and provided with an upper access opening.

In such molds, the casting may be carried out by subjecting the filling metal, which is in the form of a tubular body, to the action of a field of intensive centrifugal forces, this tubular body then being cut up into slices each representing the blank of an external ring 3.

Figure 4:
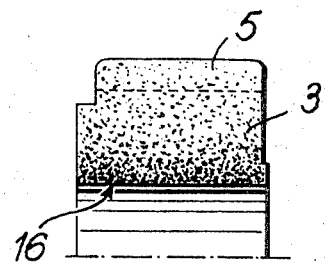
FIG. 4 shows schematically a partial section of the differential distribution of carbon in a section of such a ring.

In such a blank, it is noted that the carbon steel has undergone a transformation which affects its homogeneity. In fact and as shown in FIG. 4, in the zone of the peripheral toothing or teeth 5, the iron content has undergone a decrease whereas in the zone of the internal opening 16, the carbon content has increased. This is due to the fact that the density of the patches of carbon is much lower than that of iron, the latter having a tendency, in the liquid state of the metal, to concentrate on the outside and to drive the patches of carbon inward.

The consequence of such a manufacturing procedure is that the region of the paths 7 are highly carburized whereas the zone of the toothing is less so. Because of this, after quenching, the toughness of the non-embrittled metal in the zone of the toothing remains very high whereas the hardness of the metal in the zone of the roller paths reaches a high value. With a medium carbon steel, one can thus distinguish the zones which are to undergo working and stresses of a perfectly specialized nature.

Figure 5:
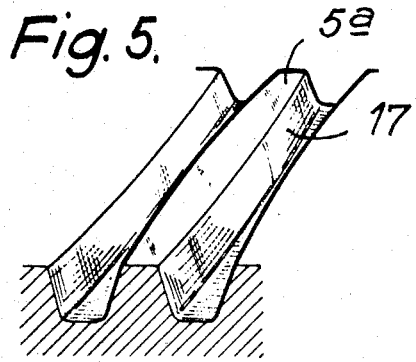
FIG. 5 is a schematic perspective view of the convex shape of the gear teeth which can be thus cast.

This manufacturing process, particularly in the case where such rings are made individually, makes it possible to provide cavities 9 for producing teeth 5a with longitudinally convex flanks 17 as shown in FIG. 5. This gives the assurance of a better distribution of loads in the gear teeth contacts. In fact, in this kind of positioning ring gear, the toothing loads are very high. The convex part of the teeth absorbs, by elastic compression, part of the loads, avoids the risk of breakage which could occur under the effect of a bad application, in particular in the marginal regions of the teeth.

Moreover, these teeth obtained by casting have the superiority of being free from any scratches which could result from conventional cutting operations. The skin of the metal is considerably improved, as well as its surface condition, so that there is no notching effect and the load capacity of the teeth is increased.

Figure 6:
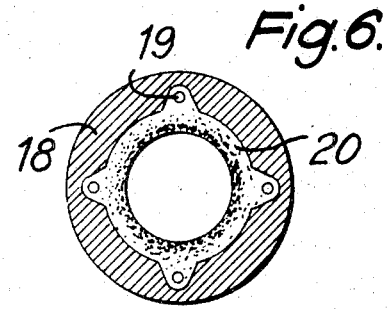
FIG. 6 represents a diagram for the casting of a ring with attaching lugs.

In the foregoing illustrative embodiments of the invention, what was involved was the making of gear teeth on the exterior of the ring by casting, but the principle also applies to other reliefs of the most varied kinds. Thus, with reference to FIG. 6 in a mold 18, for example, it is possible to provide cavities permitting the casting of lugs 19 for the attachment of a ring 20 on any desired support, which lugs can be cast, by means of suitable cores. directly with perforations used in conjunction with means of attachment, such as bolts, on the corresponding supports.

Instead of such lugs, it would thus be possible to provide dogs, notches or other configurations for the most varied uses. In addition, in unit casting, the lateral faces of the ring could be provided with any desired reliefs or hollows.

Whatever the configuration of the external reliefs, they have the same qualities of toughness as the gear teeth described above.

It is clear that, without leaving the scope of the invention, modifications are possible in the manufacturing process itself as well as in the products resulting from its application. Thus, the appellation of steels should be understood to include all iron or carbon-based alloys. Moreover, all rolling elements, such as balls, rollers, needles or other elements, could be used.

What is claimed is:

1. A process of manufacturing bearing-rings of steel having external reliefs, comprising the steps of:
   centrifugally casting steel in a ring shaped mold to cause the migration of the iron particles of the steel toward an internal region of said bearing-ring being cast to cause a higher carbon content in the internal region relative to the external region of said bearing-ring; and
   quenching said bearing-ring to give a greater degree of hardness to its internal region relative to its external region, and a greater degree of toughness to its external region relative to its internal region due to the higher carbon content in the internal region of said bearing-ring.

2. A process as claimed in claim 1, including the additional step of centrifugally casting teeth around the external region of said bearing-ring integral with said bearing-ring.

3. A process as claimed in claim 1, including the additional step of centrifugally casting gear teeth around the external region of said bearing-ring integral with said bearing-ring.

4. A process as claimed in claim 1, including the additional step of centrifugally casting gear teeth having longitudinally convex flanks around the external region of said bearing-ring integral with said bearing-ring.

5. A process as claimed in claim 1, including the additional step of centrifugally casting a series of reliefs having the form of attachment lugs around the external surface of said bearing-ring integral with said bearing-ring.

* * * * *